US008036140B2

(12) United States Patent
Rao et al.

(10) Patent No.: US 8,036,140 B2
(45) Date of Patent: Oct. 11, 2011

(54) APPLICATION PROGRAMMING INTERFACE FOR INVITING PARTICIPANTS IN A SERVERLESS PEER TO PEER NETWORK

(75) Inventors: Ravi Rao, Redmond, WA (US); Eliot John Flannery, Redmond, WA (US); Tomer Weisberg, Bellevue, WA (US); Upshur Warren Parks, III, Bothell, WA (US); Rohit Gupta, Redmond, WA (US); Kevin R. Tao, Kirkland, WA (US); Anirudh Anirudh, Redmond, WA (US); David G. Thaler, Redmond, WA (US); Andre R. Classen, Bellevue, WA (US); Todd R. Manion, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 942 days.

(21) Appl. No.: 11/112,347

(22) Filed: Apr. 22, 2005

(65) Prior Publication Data
US 2006/0239295 A1 Oct. 26, 2006

(51) Int. Cl.
*H04L 12/28* (2006.01)
*G06F 15/16* (2006.01)
(52) U.S. Cl. ........................................ 370/254; 709/206
(58) Field of Classification Search ..................... None
See application file for complete search history.

(56) References Cited

U.S. PATENT DOCUMENTS

| | | | |
|---|---|---|---|
| 4,874,963 A | 10/1989 | Alspector | |
| 5,293,457 A | 3/1994 | Arima et al. | |
| 5,369,705 A | 11/1994 | Bird et al. | 713/163 |
| 5,371,794 A | 12/1994 | Diffie et al. | 713/156 |
| 5,386,542 A | 1/1995 | Brann et al. | 709/248 |
| 5,706,462 A | 1/1998 | Matousek | 711/118 |
| 5,712,914 A | 1/1998 | Aucsmith et al. | 380/30 |
| 5,748,736 A | 5/1998 | Mittra | 713/163 |
| 5,761,421 A | 6/1998 | Van Hoff et al. | 709/223 |
| 5,806,075 A | 9/1998 | Jain et al. | 707/201 |
| 5,832,514 A | 11/1998 | Norin et al. | 707/202 |
| 5,854,898 A | 12/1998 | Riddle | 709/231 |
| 5,901,227 A | 5/1999 | Perlman | 713/157 |
| 5,905,884 A * | 5/1999 | Williams | 709/227 |

(Continued)

FOREIGN PATENT DOCUMENTS

EP     1248441     10/2002

(Continued)

OTHER PUBLICATIONS

"Artificial Neural Network," Wikipedia Encyclopedia, http://en.wikipedia.org/wiki/Artificial_neural_network (Mar. 14, 2006).

(Continued)

*Primary Examiner* — Chirag Shah
*Assistant Examiner* — Joshua Smith
(74) *Attorney, Agent, or Firm* — Merchant & Gould PC (57) ABSTRACT

Methods and computer readable mediums are described that facilitate inviting user entities on a network. The method may include initiating a first application for sending an invitation by a first user entity on a first endpoint, selecting a second user entity to receive the invitation, and selecting an activity. The method may also include sending from the first endpoint to the second user entity the invitation to participate in the activity if the first endpoint determines the activity is supported by a computing application on the first endpoint.

10 Claims, 4 Drawing Sheets

U.S. PATENT DOCUMENTS

| | | | |
|---|---|---|---|
| 5,907,685 A | 5/1999 | Douceur | 709/248 |
| 5,917,480 A | 6/1999 | Tafoya et al. | 715/732 |
| 5,922,074 A | 7/1999 | Richard et al. | 726/21 |
| 5,933,849 A | 8/1999 | Srbljic et al. | 711/118 |
| 5,944,794 A | 8/1999 | Okamoto et al. | 709/225 |
| 5,982,898 A | 11/1999 | Hsu et al. | 713/158 |
| 5,987,376 A | 11/1999 | Olson et al. | 701/201 |
| 6,012,096 A | 1/2000 | Link et al. | 709/233 |
| 6,016,505 A | 1/2000 | Badovinatz et al. | 709/205 |
| 6,044,350 A | 3/2000 | Weiant, Jr. et al. | 705/1 |
| 6,078,948 A | 6/2000 | Podgorny et al. | 709/204 |
| 6,081,845 A | 6/2000 | Kanemaki et al. | 709/238 |
| 6,085,320 A | 7/2000 | Kaliski, Jr. | 713/168 |
| 6,088,805 A | 7/2000 | Davis et al. | 726/10 |
| 6,092,201 A | 7/2000 | Turnbull et al. | 726/4 |
| 6,097,811 A | 8/2000 | Micali | 713/186 |
| 6,108,687 A | 8/2000 | Craig | 709/203 |
| 6,128,740 A | 10/2000 | Curry et al. | 713/158 |
| 6,134,658 A | 10/2000 | Multerer et al. | 713/175 |
| 6,141,760 A | 10/2000 | Abadi et al. | 726/14 |
| 6,148,383 A | 11/2000 | Micka et al. | 711/162 |
| 6,155,840 A | 12/2000 | Sallette | 434/323 |
| 6,163,809 A | 12/2000 | Buckley | 709/237 |
| 6,189,034 B1 * | 2/2001 | Riddle | 370/261 |
| 6,205,481 B1 | 3/2001 | Heddaya et al. | 709/226 |
| 6,216,110 B1 | 4/2001 | Silverberg | 705/9 |
| 6,219,706 B1 | 4/2001 | Fan et al. | |
| 6,237,025 B1 | 5/2001 | Ludwig | 709/204 |
| 6,266,420 B1 | 7/2001 | Langford et al. | 380/282 |
| 6,269,099 B1 | 7/2001 | Borella et al. | 370/389 |
| 6,311,209 B1 | 10/2001 | Olson et al. | 709/204 |
| 6,336,141 B1 | 1/2002 | Fujiyama et al. | 709/224 |
| 6,351,813 B1 | 2/2002 | Mooney et al. | 713/185 |
| 6,363,352 B1 | 3/2002 | Dailey et al. | 705/9 |
| 6,470,375 B1 | 10/2002 | Whitner et al. | 718/105 |
| 6,490,253 B1 | 12/2002 | Miller et al. | 370/241 |
| 6,526,411 B1 | 2/2003 | Ward | 707/102 |
| 6,529,950 B1 | 3/2003 | Lumelsky et al. | 709/218 |
| 6,532,217 B1 | 3/2003 | Alkhatib et al. | 370/252 |
| 6,560,636 B2 | 5/2003 | Cohen et al. | 709/203 |
| 6,564,261 B1 | 5/2003 | Gudjonsson et al. | 709/227 |
| 6,581,110 B1 | 6/2003 | Harif et al. | 709/248 |
| 6,636,854 B2 | 10/2003 | Dutta et al. | 707/10 |
| 6,636,889 B1 | 10/2003 | Estrada et al. | 709/203 |
| 6,653,933 B2 | 11/2003 | Raschke et al. | 370/203 |
| 6,654,796 B1 | 11/2003 | Slater et al. | 709/220 |
| 6,658,568 B1 | 12/2003 | Ginter et al. | 713/193 |
| 6,675,205 B2 | 1/2004 | Meadway et al. | 709/219 |
| 6,675,261 B2 | 1/2004 | Shandony | 711/121 |
| 6,683,865 B1 | 1/2004 | Garcia-Luna-Aceves et al. | 370/349 |
| 6,701,344 B1 | 3/2004 | Holt et al. | 709/204 |
| 6,704,293 B1 * | 3/2004 | Larsson et al. | 370/255 |
| 6,714,966 B1 | 3/2004 | Holt et al. | 709/204 |
| 6,721,890 B1 | 4/2004 | Shrikhande | |
| 6,725,281 B1 | 4/2004 | Zintel et al. | |
| 6,728,753 B1 | 4/2004 | Parasnis et al. | 709/203 |
| 6,745,178 B1 | 6/2004 | Emens et al. | 707/3 |
| 6,748,530 B1 | 6/2004 | Aoki et al. | 713/156 |
| 6,754,829 B1 | 6/2004 | Butt et al. | 726/8 |
| 6,775,782 B1 | 8/2004 | Buros et al. | 726/2 |
| 6,779,004 B1 | 8/2004 | Zintel | |
| 6,791,582 B2 | 9/2004 | Linsey et al. | 715/751 |
| 6,801,604 B2 | 10/2004 | Maes et al. | 379/88.17 |
| 6,823,327 B1 | 11/2004 | Klug et al. | 707/1 |
| 6,892,230 B1 | 5/2005 | Gu et al. | |
| 6,912,622 B2 | 6/2005 | Miller | 711/129 |
| 6,920,455 B1 | 7/2005 | Weschler | 707/100 |
| 6,968,179 B1 | 11/2005 | De Vries | 455/414.1 |
| 6,981,043 B2 | 12/2005 | Botz et al. | 709/225 |
| 6,982,982 B1 * | 1/2006 | Barker et al. | 370/395.54 |
| 6,983,400 B2 | 1/2006 | Volkov | 714/38 |
| 6,986,258 B2 | 1/2006 | Bradley et al. | 62/46.1 |
| 6,990,514 B1 | 1/2006 | Dodrill et al. | 709/206 |
| 7,062,681 B2 | 6/2006 | Larsson et al. | 714/39 |
| 7,065,579 B2 | 6/2006 | Traversat et al. | 709/230 |
| 7,065,587 B2 | 6/2006 | Huitema et al. | 709/245 |
| 7,068,789 B2 | 6/2006 | Huitema et al. | 380/277 |
| 7,073,132 B1 | 7/2006 | Rydahl et al. | 715/745 |
| 7,130,999 B2 | 10/2006 | Yasala et al. | 713/157 |
| 7,139,760 B2 | 11/2006 | Manion et al. | 707/10 |
| 7,159,223 B1 | 1/2007 | Comeau | 719/310 |
| 7,181,620 B1 | 2/2007 | Hur | 713/171 |
| 7,185,194 B2 | 2/2007 | Morikawa et al. | 713/156 |
| 7,197,049 B2 | 3/2007 | Engstrom et al. | 370/261 |
| 7,213,060 B2 | 5/2007 | Kemp et al | 709/222 |
| 7,272,636 B2 | 9/2007 | Pabla | 709/216 |
| 7,299,351 B2 | 11/2007 | Huitema et al. | 713/156 |
| 7,340,500 B2 | 3/2008 | Traversat et al. | 709/201 |
| 7,346,696 B2 | 3/2008 | Malik | 709/229 |
| 7,401,152 B2 | 7/2008 | Traversat et al. | 709/230 |
| 7,401,153 B2 | 7/2008 | Traversat et al. | 709/230 |
| 2001/0003191 A1 | 6/2001 | Kovacs et al. | 709/226 |
| 2001/0035976 A1 | 11/2001 | Poon | 358/1.15 |
| 2001/0053213 A1 | 12/2001 | Truong et al. | 379/202.01 |
| 2002/0027569 A1 | 3/2002 | Manni et al. | |
| 2002/0059425 A1 | 5/2002 | Belfiore et al. | 709/226 |
| 2002/0073204 A1 | 6/2002 | Dutta et al. | 709/227 |
| 2002/0078243 A1 | 6/2002 | Rich et al. | 709/248 |
| 2002/0095399 A1 | 7/2002 | Devine et al. | 707/1 |
| 2002/0097267 A1 | 7/2002 | Dinan et al. | 715/757 |
| 2002/0112058 A1 | 8/2002 | Weisman et al. | |
| 2002/0120774 A1 | 8/2002 | Diacakis | 709/245 |
| 2002/0124081 A1 * | 9/2002 | Primm et al. | 709/224 |
| 2002/0140730 A1 | 10/2002 | Linsey et al. | 345/751 |
| 2002/0143944 A1 | 10/2002 | Traversat et al. | |
| 2002/0143989 A1 * | 10/2002 | Huitema et al. | 709/243 |
| 2002/0144149 A1 | 10/2002 | Hanna et al. | 726/5 |
| 2002/0154172 A1 | 10/2002 | Linsey et al. | 715/804 |
| 2002/0184358 A1 | 12/2002 | Traversat et al. | 709/223 |
| 2002/0188657 A1 | 12/2002 | Traversat et al. | 709/201 |
| 2002/0188881 A1 | 12/2002 | Liu et al. | 713/401 |
| 2002/0194484 A1 | 12/2002 | Bolosky et al. | 713/189 |
| 2003/0014485 A1 | 1/2003 | Banatwala | 709/204 |
| 2003/0018725 A1 * | 1/2003 | Turner et al. | 709/228 |
| 2003/0036941 A1 | 2/2003 | Leska et al. | 705/9 |
| 2003/0037146 A1 * | 2/2003 | O'Neill | 370/254 |
| 2003/0055892 A1 | 3/2003 | Huitema et al. | |
| 2003/0056093 A1 | 3/2003 | Huitema et al. | |
| 2003/0056094 A1 | 3/2003 | Huitema et al. | |
| 2003/0088544 A1 | 5/2003 | Kan et al. | 707/3 |
| 2003/0097425 A1 | 5/2003 | Chen | |
| 2003/0117433 A1 | 6/2003 | Milton et al. | |
| 2003/0126027 A1 | 7/2003 | Nelson et al. | 705/26 |
| 2003/0131073 A1 | 7/2003 | Lucovsky et al. | 715/500 |
| 2003/0135629 A1 | 7/2003 | Sasaki et al. | 709/229 |
| 2003/0140119 A1 | 7/2003 | Acharya et al. | 709/219 |
| 2003/0147386 A1 | 8/2003 | Zhang et al. | 370/390 |
| 2003/0174682 A1 * | 9/2003 | Barker, Jr. | 370/338 |
| 2003/0177184 A1 | 9/2003 | Dickerman et al. | |
| 2003/0191753 A1 | 10/2003 | Hoch | 707/3 |
| 2003/0193961 A1 * | 10/2003 | Moore et al. | 370/401 |
| 2003/0196060 A1 | 10/2003 | Miller | 711/170 |
| 2003/0204626 A1 * | 10/2003 | Wheeler | 709/245 |
| 2003/0204742 A1 | 10/2003 | Gupta et al. | |
| 2003/0208583 A1 * | 11/2003 | Schroeder | 709/223 |
| 2003/0217073 A1 | 11/2003 | Walther et al. | 707/104.1 |
| 2003/0217142 A1 | 11/2003 | Bobde et al. | 709/224 |
| 2003/0225843 A1 | 12/2003 | Sakata | 709/206 |
| 2004/0008652 A1 | 1/2004 | Tanzella et al. | 370/338 |
| 2004/0019640 A1 | 1/2004 | Bartram et al. | |
| 2004/0037271 A1 | 2/2004 | Liscano et al. | 370/352 |
| 2004/0064568 A1 | 4/2004 | Arora et al. | |
| 2004/0064693 A1 | 4/2004 | Pabla et al. | 713/168 |
| 2004/0078436 A1 | 4/2004 | Demsky et al. | 709/206 |
| 2004/0082351 A1 | 4/2004 | Westman | 455/518 |
| 2004/0088325 A1 | 5/2004 | Elder et al. | 707/104.1 |
| 2004/0100953 A1 | 5/2004 | Chen et al. | 370/389 |
| 2004/0111423 A1 | 6/2004 | Irving et al. | 707/100 |
| 2004/0111439 A1 | 6/2004 | Richardson et al. | 707/200 |
| 2004/0111469 A1 | 6/2004 | Manion et al. | |
| 2004/0111515 A1 | 6/2004 | Manion et al. | 709/227 |
| 2004/0111525 A1 | 6/2004 | Berkland et al. | 709/231 |
| 2004/0117446 A1 | 6/2004 | Swanson | 709/205 |
| 2004/0120344 A1 | 6/2004 | Sato et al. | 370/465 |
| 2004/0122898 A1 | 6/2004 | Srinivasa | 709/205 |

| | | | |
|---|---|---|---|
| 2004/0122901 A1 | 6/2004 | Sylvain | 709/206 |
| 2004/0128350 A1 | 7/2004 | Topfl et al. | 709/204 |
| 2004/0133640 A1 | 7/2004 | Yeager et al. | 709/204 |
| 2004/0140730 A1 | 7/2004 | Barrho et al. | 310/257 |
| 2004/0141005 A1 | 7/2004 | Banatwala et al. | 715/751 |
| 2004/0142709 A1 | 7/2004 | Coskun et al. | |
| 2004/0143603 A1 | 7/2004 | Kaufmann et al. | 707/104.1 |
| 2004/0148333 A1 | 7/2004 | Manion et al. | |
| 2004/0148611 A1 | 7/2004 | Manion et al. | 719/328 |
| 2004/0153506 A1 | 8/2004 | Ito et al. | |
| 2004/0162871 A1 | 8/2004 | Pabla et al. | 709/201 |
| 2004/0172452 A1* | 9/2004 | Erickson et al. | 709/206 |
| 2004/0172455 A1 | 9/2004 | Green et al. | 709/207 |
| 2004/0172456 A1 | 9/2004 | Green et al. | 709/207 |
| 2004/0184445 A1 | 9/2004 | Burne | 370/352 |
| 2004/0190549 A1 | 9/2004 | Huitema et al. | 370/466 |
| 2004/0193686 A1 | 9/2004 | Blagsvedt et al. | 709/206 |
| 2004/0205167 A1* | 10/2004 | Grumann | 709/220 |
| 2004/0205243 A1 | 10/2004 | Hurvig et al. | 709/245 |
| 2004/0210639 A1 | 10/2004 | Ben-Yoseph et al. | |
| 2004/0228531 A1 | 11/2004 | Fernandez et al. | 310/71 |
| 2004/0242329 A1 | 12/2004 | Blackburn et al. | 463/42 |
| 2004/0249907 A1 | 12/2004 | Brubacher et al. | |
| 2004/0249953 A1 | 12/2004 | Fernandez et al. | 709/227 |
| 2004/0249970 A1 | 12/2004 | Castro et al. | 709/238 |
| 2004/0255029 A1 | 12/2004 | Manion et al. | |
| 2004/0260771 A1 | 12/2004 | Gusler et al. | 709/206 |
| 2004/0260800 A1 | 12/2004 | Gu et al. | |
| 2005/0004916 A1* | 1/2005 | Miller et al. | 709/201 |
| 2005/0004968 A1 | 1/2005 | Mononen et al. | 709/200 |
| 2005/0004984 A1 | 1/2005 | Simpson | 709/205 |
| 2005/0007962 A1* | 1/2005 | Nam et al. | 370/254 |
| 2005/0009537 A1 | 1/2005 | Crocker et al. | 455/456.3 |
| 2005/0022210 A1 | 1/2005 | Zintel et al. | |
| 2005/0027805 A1 | 2/2005 | Aoki | 709/206 |
| 2005/0038856 A1 | 2/2005 | Krishnasamy et al. | 709/206 |
| 2005/0066001 A1 | 3/2005 | Benco et al. | 709/204 |
| 2005/0071440 A1 | 3/2005 | Jones et al. | 709/218 |
| 2005/0074018 A1 | 4/2005 | Zintel et al. | |
| 2005/0080768 A1 | 4/2005 | Zhang et al. | 707/3 |
| 2005/0080848 A1 | 4/2005 | Shah | 709/204 |
| 2005/0080859 A1 | 4/2005 | Lake | 709/206 |
| 2005/0086300 A1 | 4/2005 | Yeager et al. | 709/204 |
| 2005/0088980 A1* | 4/2005 | Olkkonen et al. | 370/255 |
| 2005/0091388 A1 | 4/2005 | Kamboh et al. | 709/228 |
| 2005/0091529 A1 | 4/2005 | Manion et al. | 726/4 |
| 2005/0097503 A1 | 5/2005 | Zintel et al. | |
| 2005/0102245 A1 | 5/2005 | Edlund et al. | 705/80 |
| 2005/0102356 A1 | 5/2005 | Manion et al. | 709/204 |
| 2005/0108371 A1 | 5/2005 | Manion et al. | 709/223 |
| 2005/0114487 A1 | 5/2005 | Peng et al. | 709/223 |
| 2005/0125529 A1 | 6/2005 | Brockway et al. | 709/224 |
| 2005/0125560 A1* | 6/2005 | Brockway et al. | 709/249 |
| 2005/0128956 A1* | 6/2005 | Hsu et al. | 370/252 |
| 2005/0138119 A1* | 6/2005 | Saridakis | 709/204 |
| 2005/0157659 A1 | 7/2005 | Huitema et al. | |
| 2005/0165934 A1* | 7/2005 | Rosenberg et al. | 709/227 |
| 2005/0171799 A1 | 8/2005 | Hull et al. | 705/1 |
| 2005/0177715 A1 | 8/2005 | Somin et al. | 713/156 |
| 2005/0182967 A1 | 8/2005 | Phillips et al. | |
| 2005/0198173 A1 | 9/2005 | Evans | 709/206 |
| 2005/0220139 A1 | 10/2005 | Aholainen | 370/466 |
| 2005/0223086 A1* | 10/2005 | Raverdy et al. | 709/220 |
| 2005/0235038 A1 | 10/2005 | Donatella et al. | 709/206 |
| 2006/0010204 A1* | 1/2006 | Jalava et al. | 709/205 |
| 2006/0015562 A1* | 1/2006 | Kilian-Kehr et al. | 709/206 |
| 2006/0031451 A1 | 2/2006 | Lortz | 709/223 |
| 2006/0036692 A1 | 2/2006 | Morinigo et al. | |
| 2006/0112177 A1 | 5/2006 | Barkley et al. | 709/224 |
| 2006/0161554 A1 | 7/2006 | Lucovsky et al. | 707/10 |
| 2006/0173959 A1 | 8/2006 | McKelvie et al. | 709/204 |
| 2006/0182113 A1* | 8/2006 | Liang et al. | 370/395.3 |
| 2006/0190600 A1 | 8/2006 | Blohm et al. | 709/225 |
| 2006/0212583 A1 | 9/2006 | Beadle et al. | 709/227 |
| 2006/0239294 A1 | 10/2006 | Wogsberg et al. | 370/466 |
| 2006/0239295 A1 | 10/2006 | Rao et al. | 370/260 |
| 2006/0242235 A1 | 10/2006 | Classen et al. | 709/204 |
| 2006/0242236 A1 | 10/2006 | Manion et al. | 709/204 |
| 2006/0245235 A1 | 11/2006 | Krieger et al. | 365/115 |
| 2007/0220156 A1 | 9/2007 | Dickerman et al. | 709/227 |
| 2007/0233875 A1 | 10/2007 | Raghav et al. | |
| 2007/0239869 A1 | 10/2007 | Raghav et al. | |
| 2008/0005325 A1 | 1/2008 | Wynn et al. | |
| 2008/0031460 A1 | 2/2008 | Brookner et al. | 380/282 |
| 2008/0137580 A1* | 6/2008 | Axelsson et al. | 370/315 |
| 2009/0248868 A1 | 10/2009 | Classen et al. | 709/224 |

FOREIGN PATENT DOCUMENTS

| | | |
|---|---|---|
| GB | 2378268 | 2/2003 |
| JP | 2002197246 | 11/2001 |
| JP | 2002335269 | 11/2002 |
| JP | 2004-265174 | 9/2004 |
| WO | WO-0120450 | 3/2001 |
| WO | WO 2005/046164 A1 | 5/2005 |
| WO | WO 2006/115934 | 11/2006 |
| WO | WO 2006/116020 | 11/2006 |
| WO | WO 2006/116056 | 11/2006 |

OTHER PUBLICATIONS

"Genetic algorithm," http://en.wikipedia.org/wiki/Genetic_algorithm (Mar. 2006).

Dabek, F., et al., "Vivaldi: A Decentralized Network Coordinate System," SIGCOMM 2004, Aug. 2004.

"Latency," http://whatis.techtarget.com/definition/0,,sid9_0212456,00.html (Mar. 2006).

"Explorations in Parallel Distributed Processing," McClelland et al., The Massachusetts Institute of Technology, 1988.

"Genetic algorihm," http://www.google.com/search?sourceid-navclient&ie-UTF-8&rls-GGLG,GGLG:2005-3 (Mar. 2006).

Ng, T.S., et al., "A Network Positioning System for the Internet," USENIX Annual Technical Conference 2004, Boston, MA, Jun. 2004.

"Neural Network," Wikipedia Encyclopedia, http://en.wikipedia.org/wiki/Neural_network (Mar. 16, 2006).

Ng, T.S., et al., "Global Network Positioning: A New Approach to Network Distance Prediction," Student Poster, SIGCOMM'01, San Diego, CA Aug. 2001.

Costa et al. "PIC: Practical Internet Coordinates for Distance Estimation," ICDCS 2004 (Mar. 2004).

Ng, T.S., et al., "Predicting Internet Network Distance with Coordinates-Based Approaches," INFOCOM'02, New York, NY, Jun. 2002.

Cox, R., et al., "Practical, Distributed Network Coordinates," HotNets Workshop, 2003.

"Distributed hash table," http://en.wikipedia.org/wiki/Distributed_hash_table (Mar. 2006).

Zhang et al. "Brushwood: Distributed Trees in Peer-to-Peer Systems" (Mar. 2006).

Ng, T.S., et al., "Towards Global Network Positioning," Extended Abstract, ACM SIGCOMM Internet Measurement Workshop 2001, San Francisco, CA, Nov. 2001.

"About Presentation Broadcasting," available at http://office.microsoft.com/en-us/assistance/HP052411931033.aspx, 3 pages.

"At What Cost Pervasive? A Social Computing View of Mobile Computing Systems," IBM Research: vol. 38, Nov. 4, 1999, Pervasive Computing, 25 pages.

"Connecting and Extending Peer-to-Peer Networks," LionShare White paper, dated Oct. 2004, available at http://lionshare.its.psu.edu/main/info/docspresentation/LionshareWP.pdf, 32 pages.

"Design Explorations: What it Means to Design," IBM Research: Social Computing Group (4 pages).

"IBM Workplace Collaboration Services Overview Guide" dated Jan. 2005, available at ftp://ftp.lotus.com/pub/lotusweb/IGM_Workplace_collaboration_servies_g224733301_118.pdf, 2 pages.

"Introduction to Windows Peer-to-Peer Networking," Microsoft Corporation, Published: Jan. 2003, 29 pages.

"METEOR-S Web Service Discovery Infrastructure," A Component of the METEOR-S System on Semantic Web Services and Processes; METEOR-S Web Service Discovery Infrastructure (MWSDI); dated Dec. 14, 2005, available at http://lsdis.cs.uga.edu/proj/meteor/mwsdi.html, 2 pages.

"Microsoft Computer Dictionary," Fifth Edition, Microsoft Press, 2002, pp. 31, 238-239, 424, 467.
"Microsoft Overhauls Longhorn Drivers for Usability, Connectivity," eWeek.com Enterprise News & Reviews, dated Dec. 14, 2005, available at http://www.eweek.com/article2/0,1759,1654462,00.asp, 5 pages.
"Microsoft, Groove Networks to Combine Forces to Create Anytime, Anywhere Collaboration," Microsoft Presspass-Information on Journalists, retrieved from http://www.microsoft.com/presspass/features/2005/mar05/03-10GrooveQA.asp, dated Mar. 10, 2005, 4 pages.
"Project JXTA: Technical Shell Overview," Sun Microsystems, Inc. May 25, 2001; retrieved from http://www.jxta.org/project/www.docs/TechShellOverview.pdf, pp. 1-12.
"Project JXTA: Technical Specification," Version 1.0, Sun Microsystems, Inc. Apr. 25, 2001; retrieved from http://download.jxta.org/files/documents/27/35/JXTA-Spec.pdf, pp. 1-26.
"Teredo Overview," Microsoft Corporation, website, Published Jan. 1, 2003, Updated Jan. 15, 2007. Available at http://www.microsoft.com/technet/prodtechnol/winxppro/maintain/teredo.mspx, © 2003 Microsoft Corporation, 28 pages.
"The Best Way to Centrally Deploy Applications and Provide On-Demand Access," available at http://www.citrix.com/English/ps2/products/product.asp?contentID=186, 1 page.
"The Gnutella Protocol Specification v. 0.4: Document Revision 1.2," Clip2, available at http://www.clip2.com, pp. 1-10.
Beatty, et al., "Web Services Dynamic Discovery (WS-Discovery)," Microsoft Corporation dated Apr. 2005, available at http://msdn.microsoft.com/library/en-us/dnglobspec/html/WS-Discovery.pdf, 35 pages.
Bolcer, et al., "Peer-to-Peer Architectures and the Magic Open Source Infrastructure," Endeavors Technology, Inc., Dec. 6, 2000.
Bouvin, "Designing User Interfaces for Collaborative Web-Based Open Hypermedia," in Proceedings of the Eleventh ACM Conference on Hypertext and Hypermedia, (San Antonio, TX, 2000), pp. 230-231.
Box, D. "Code Name Indigo: A Guide to Developing and Running Connected Systems with Indigo," Microsoft Corporation 2005, http://msdn.microsoft.com/msdnmag/issues/04/01/indigo/?print=true, 11 pages.
Boyer, et al., "Virtual Social Clubs: Meeting Places for the Internet Community," IEEE International Conference on Multimedia Computing and Systems, (Florence, Italy, Jun. 7-11, 1999), pp. 297-301.
Castro, et al., "Secure Routing for Structured Peer-to-Peer Overlay Networks," Usenix, OSDI '02 paper (OSDI '02 Tech Program Index), Proceedings, Fifth Symposium on Operating Systems Design and Implementation (OSDI 2002) available at http://www.usenix.org/events/osdi02/tech/full_papers/castro/castro_html, pp. 299-314.
Castro, et al., "Topology-Aware Routing in Structured Peer-to-Peer Overlay Networks," Technical Report MSR-TR-2002-82, Microsoft Research, Microsoft Corporation, http://www.research.microsoft.com.
Chappell, D., "Introducing Indigo: An Early Look," Microsoft Corporation 2005, http://msdn.microsoft.com/library/en-us/dnlong/html/introindigov1-0.asp?frame=true, 18 pages.
Cheung, "Chatopus for Palm OS, Using IM Bots for Jabber," Chatopus-Palm OS Instant Messaging Client for XMPP/Jabber, Dated Oct. 20, 2004, available at http://www.chatopus.com/articles/bots.html, 5 pages.
Clark, et al., "Freenet: A Distributed Anonymous Information Storage and Retrieval System," H. Federrath (Ed.), Anonymity 2000, LNCS 2009, (2001), pp. 46-66.
Dorohonceanu, et al., "A Desktop Design for Synchronous Collaboration," in Proceedings of the Graphics Interface '99 (GI'99), (Kingston, Ontario, Canada, Jun. 1999), pp. 27-35.
Druschell, P., et al., PAST: A large-scale, persistent peer-to-peer storage utility, at Rice University and Microsoft Research, 6 pages.
Ellison, C., "Simple Public Key Certificate," Internet Draft, Jul. 29, 1999, at http://www.world.std.com/~cme/spki,txt, 40 pages.
Ellison, C., "SPKI Certificate Theory," The Internet Society, Sep. 1999, at http://www.ietf.org/rc/rfc2693.txt?number=2693, 37 pages.

Ellison, C., "SPKI Requirements," The Internet Society, Sep. 1999, at http://www.ietf.org/rfc/rfc2692.txt?number=2692, 12 pages.
Erdelsky, P., "The Birthday Paradox," EFG, at http://www.efgh.com/math/birthday.htm, Jul. 4, 2001, 3 pages.
European Search Report for EP 06111103 dated Jun. 13, 2006.
European Search Report; EP 02 00 5770; Munich; Aug. 9, 2005.
Farnham et al, "Supporting Social ability in a Shared Browser," in Proceedings of Interact Conference (Tokyo, Japan, Jul. 2001), available at http://research.microsoft.com/scg/papers/sharedbrowinginteract.pdf, pp. 1-8.
Gagnes, et al., "Discovering Semantic Web Services in Dynamic Environments," Norwegian Defense Research Establishment (FFI), University of Oslo, Department of Informatics, Oslo, Norway, Sep. 27, 2007, pp. 1-31.
Garcia, et al., "Extending a Collaborative Architecture to Support Emotional Awareness," EBAA '99—Workshop on Emotion—Based Agent Architectures, (May 2, 1992), pp. 46-52.
Gong, Li. "Project JXTA: A Technology Overview," Sun Microsystems, Inc. Apr. 25, 2001; retrieved from http://download.jxta.org/files/documents/27/35/JXTA-Tech-Overview.pdf, pp. 1-12.
Greenberg et al, "Using a Room Metaphor to Ease Transitions in Groupware," University of Calgary, Department of Computer Science, Research Report 98/611/02, 31 pages (1998).
Gutwin, "Workspace Awareness in Real-Time Distributed Groupware," The University of Calgary, Department of Computer Science, Ph.D. Thesis, 270 pages (Dec. 1997).
Handley, et al., "SIP: Session Initiation Protocol," Network Working Group, Request for Comments 2543, (Mar. 1999) pp. 1-153.
Hong, et al., "Dynamic Group Support in LANMAR Routing Ad Hoc Networks," IEEE, pp. 304-308 (2002).
Hoschek, Wolfgang, "A Unified Peer-to-Peer Database Framework for Scalable Service and Resource Discovery," M. Parasher (Ed.), GRIG 2002, LNCS 2536, (2002), pp. 126-144.
Joa-Ng, M., et al., "A Peer-to-Peer Zone Based Two-level Link State Routing for Mobile Ad Hoc Networks," IEEE Journal on Selected Areas in Communications, vol. 17, No. 8, (Aug. 1999), pp. 1415-1425.
Kollock, P. "The Economies of Online Cooperation: Gifts and Public Goods in Cyberspace," in Communities in Cyberspace, (Smith, et al., eds.), (Routledge, London, UK, 1999), available at http://www.sscnet.ucla.edu/soc/faculty/kollock/papers/economies.htm, pp. 1-17.
Kollock, P. et al., "Managing the Virtual Commons: Cooperation and Conflict in Computer Communities," in Computer-Mediated Communication: Linguistic, Social, and Cross-Cultural Perspectives, (Herring, ed.), (John Benjamins, Amsterdam, Netherlands, 1996), available at http://research.microsoft.com/scg/papers/KollockCommons.htm, pp. 109-128.
Kwon, G. et al., "An efficient Peer-to-Peer File Sharing Exploiting Hierarchy and Asymmetry," IEEE, (2003), pp. 226-233.
Labovitz, C. et al., "Internet Routing Instability," SIGCOMM '97, ACM, (1997), pp. 115-126.
Lai, K., et al., "Measuring Link Bandwidths Using a Deterministic Model of Packet Delay," at Department of Computer Science at Stanford University, 13 pages.
Lee, J. et al., "Supporting Multi-User, Multi Applet Workspaces in CBE," in Proceedings of the ACM 1996 conference on Computer Supported Cooperative Work, (Cambridge, Ma, 1996), pp. 344-353.
Legedza, U. et al., "Using Network-Level Support to Improve Cache Routing," Hamilton, et al., (Ed.), Computer Networks and ISDN Systems: The International Journal of Computer and Telecommunications Networking, vol. 30, No. 22-23, (1998), pp. 2193-2201.
Liscano, Ramiro, Professor, "Presence and Awareness Services," available at SITE, University of Ottawa, http://www.site.uottawa.ca/~rliscano/tutorials/PresenceAwarenessServices.pdf, 89 pages.
Loesing, K. et al., "An Implementation of Reliable Group Communication based on the Peer-to-Peer Network JXTA," IEEE, 2005, pp. 1-5.
Meeting Maker-Meeting Maker printout, available at http://www.meetingmaker.com/products/meetingmaker/default.cfm, 2004, 1 page.

Morris, J. "Data Structures and Algorithms—Sections 8.3 Has Tables," Online Publication 1998; http://clips.ee.uwa.edu.au/{morris/Year2/PLDS210/hash_tables.html, on Nov. 11, 2009.

Newmarch, J. "JXTA Overview," Oct. 7, 2002, retrieved from http://jan.netcomp.monash.edu.au/distjava/jxta.html, pp. 1-14.

Office Action Final for U.S. Appl. No. 11/112,133 dated Oct. 5, 2009.

Office Action Non Final for U.S. Appl. No. 11/112,135 dated Sep. 18, 2008.

Office Action Non-Final for U.S. Appl. No. 11/112,133 dated Mar. 4, 2009.

Office Action Non-Final for U.S. Appl. No. 11/112,134 dated Mar. 20, 2009.

Office Action Non-Final for U.S. Appl. No. 11/112,134 dated Jun. 25, 2008.

Oram, A., "Peer-to-Peer: Harnessing the Benefits of a Disruptive Technology," Mar. 15, 2001; pp. 94-122.

Partial European Search report; EP 02 00 5770; Mar. 27, 2005.

Portmann, M. et al., "The Cost of Application-level Broadcast in a Fully Decentralized Peer-to-Peer Network," Proceedings ISCC 2002 Seventh International Symposium, (2002), pp. 941-946.

Portmann, M. et al., "The Cost of Peer Discovery and Searching in the Gnutella Peer-to-Peer File Sharing Protocol," Proceedings Ninth IEEE International Conference on Networks, (2001), pp. 263-268.

Ratnasamy, S. et al., "A Scalable Content-Addressable Network," SIGCOMM '01, ACM, pp. 161-172, 2001.

Red-Black Tree, National Institute of Standards and Technology, at http://www.nist.gov/dads/HTML/redblack.html, Aug. 18, 2008, 2 pages.

Reynolds, J., "BOOTP Vendor Information Extensions," Network Working Group, http://www.faqs.org/rfc/rfc1395.txt, retrieved Dec. 23, 2005, Jan. 1993, pp. 1-8.

Rowstron, A. et al., "Pastry: Scalable, Distributed Object Location and Routing for Large-Scale Peer-to-Peer Systems," at Microsoft Research, Ltd., St. George House and Rice University, 20 pages, (2001).

Rowstron, A. et al., "SCRIBE: The Design of a Large-Scale Event Notification Infrastructure," at Microsoft Research, Ltd., St. George House and Rice University, 20 pages, (2001).

Rowstron, A. et al., "Storage Management and Caching in PAST, A Large-Scale, Persistent Peer-to-Peer Storage Utility," at Microsoft Research, Ltd., St. George House and Rice University, (Nov. 2001), 14 pages.

Saroiu, S. et al., "A Measurement Study of Peer-to-Peer File Sharing Systems," Technical Report #US-CSE-01-06-02, Department of Computer Science & Engineering, University of Washington, Seattle, Washington, 14 pages, 2001.

Schmidt, K. et al., "A Generic System for Web-Based Group Interaction," in Proceedings of the Thirty-First Hawaii International Conference on System Sciences, vol. 1, (Kohala Coast, HI, Jan. 6-9, 1998), pp. 545-554.

Sedgewick, R.; Algorithms in C—Third Edition—Part of Chapter XIV; Algorithms in C ++ Third Edition, 1998; Section 14.4, pp. 573-608.

Sedgewick, R.; Algorithms in C—Third Edition—Part of Chapter XVI; Algorithms in C—Third Edition, 1998; pp. 662-691.

SlidesNow! Available at http://www.slidesnow.com/about.shtml, on Apr. 10, 2005, 2 pages.

Smith et al, "The Social Life of Small Graphical Chat Spaces," in Proceedings of the SIGCHI Conference on Human Factors in Computing Systems, (The Hague, Netherlands Mar. 2000), available at http://research.microsoft.com/scg/papers/vchatchi2000.pdf, pp. 462-469.

Smith, et al., "What Do People Do in Virtual Worlds? An Analysis of V-Chat Log File Data," Microsoft Corporation Report (Apr. 1, 1998), available at http://research.microsoft.com/scg/papers/kollockvpchat.pdf.

Stoica, I. et al., "Chord: A Scalable Peer-to-Peer Lookup Service for Internet Applications," SIGCOMM '01, ACM, pp. 149-160 (2001).

Sunaga, H. et al., "Advanced Peer-to-Peer Network Platform for Various Services-SIONet (Semantic Information Oriented Network," Proceedings of the Second International Conference on Peer-to-Peer Computing, IEEE, (2002), pp. 169-170.

Tannenbaum, Andrew S., "Computer Networks," Third Edition, Prentice Hall PTR, 1996; pp. 437-449.

Traversat, B. et al., "Project JXTA Virtual Network," Sun Microsystems, Inc. Oct. 28, 2002, pp. 1-10.

Tyson, Jeff, "How the old Napster worked," available at http://computer.howstuffworks.com/napster.htm/printable, (2005), 4 pages.

Written Opinion for PCT/US06/15050 mailed Oct. 23, 2007.

Xiao, L. et al., "On Reliable and Scalable Peer-to-Peer Web Document Sharing," Proceedings of the International Parallel and Distributed Processing Symposium, IEEE, (2002), pp. 23-30.

Zhang, X. et al., "gMeasure: A Group-Based Network Performance Measurement Service for Peer-to-Peer Applications," IEEE Globecom 2002, 5 pages.

Zhao, et al., "Tapestry: An Infrastructure for Fault-tolerant Wide-area Location and Routing," Report No. UCB/CSD-01-1141, Computer Science Division (EECS), University of California Berkeley, California, (2001), 27 pages.

Zhao, F. et al., "A Web Based Multi-Display Presentation System," available at http://www.fxpal.com/publications/FXPAL-PR-04-303.pdf, on Jul. 1, 2005, 2 pages.

Adamic, L., "P2P Search that Scales," pre-presentation description for talk on Nov. 7, 2001, available at http://conferences.oreillynet.com/cs/p2web2001/view, 1 page.

Cheng, et al., "Hutchworld: Lessons Learned. A Collaborative Project: Fred Hutchinson Cancer Research Center & Microsoft Research," *in Proceedings of Second International Conference on Virtual Worlds* (*VW 2000*), (Paris, France, Jul. 5-7, 2000), available at http://research.microsoft.com/scg/papers.hutchvw2000.pdf, pp. 1-12.

Cugola, et al., "Peer to Peer for Collaborative Applications," in Proceedings of the $22^{nd}$ International Conference on Distributed Computing Systems Workshops (ICDCS'02), (Vienna, Austria, Jul. 2-5, 2002), pp. 359-364.

Dabek, F. et al. "Building Peer-to-Peer Systems with Chord, a Distributed Lookup Service," at MIT Laboratory for Computer Science, 6 pages, at http://pdos.Ics.mit.edu/chord, 6 pages.

Duhr, "Oberflachenelemente in interaktiven and kooperativen anwendungen," Universitat Oldenburg, Department of Information Systems Thesis (Aug. 2000), 106 pages.

Greenberg, Collaborative Interfaces for the Web, in Human Factors and Web Development (Forsythe, et al., eds), Chapter 18, pp. 241-253, LEA Press (1997).

Huitema, C., "Distributed Peer-to-Peer Name Resolution," Presentation Slides from the O'Reilly Peer-to-Peer and Web Services Conference, Nov. 5, 2001, 19 pages.

*IBM Lotus Instant Messaging and Web Conferencing*, IBM Software-IBM Lotus Instant Messaging and Web Conferencing home pages on Apr. 19, 2005, 3 pages.

International Search Report for PCT/US06/15050, mailed Oct. 23, 2007.

Joa-Ng, M. et al., "A GPS-based Peer-to-Peer Hierarchical Link State Routing for Mobile Ad Hoc Networks," IEEE 51st Vehicular Technology Conference Proceedings, vol. 3, (2000), pp. 1752-1756.

Langley, A., The Freenet Protocol, The Free Network Project, at http://freenet.sourceforge.net/index.php?page=protocol (May 21, 2001), 15 pages.

Meeting Maker—WebEvent Publish printout, 2 pages printed on Jul. 1, 2005 from http://www.meetingmaker.com/products/webevent_publish/default.cfm.

Microsoft.com, "Peer-to-Peer Common Documentation," available at http://msdn.microsoft.com/library/default.asp?url=/library/en-us/p2ppsdk/p2p/peer_to_common_documentation.asp, (last visited Aug. 5, 2005).

*News: Sun Incorporating JXTA into Prodcuts*, java.net The Source for Java Technology Collaboration, Jan. 30, 2004, retrieved from http://today.java.net.pub/n/SunKXTA on Jan. 19, 2006, 3 page.

*Products: Groove Virtual Office FAQ*, Groove Networks, retrieved from http://www.groove.net/index.cfm?pagename=VO_FAQ on Jan. 18, 2006, 7 pages.

*Products: Groove Virtual Office*, Groove Networks, retrieved from http://www.groove.net/index.cfm/pagename/VirtrualOFfice on Jun. 1, 2005, 2 pages.

*Products: Why Groove*, Groove Networks, retrieved from http://www.grove.net/index.cfm?pagename=Products_Overview on Jan. 18, 2006, 3pages.
*Project JXTA: An Open, Innovative Collaboration*, Sun Microsystems, Inc. Apr. 25, 2001, pp. 1-5.
*Publication Related to Pastry*, http://research.microsoft.com/~antr/Pastry/pubs.htm, Jun. 23, 2005, 2 pages.
QuickTime Broadcaster available at http://www.apple.com/quicktime/broadcaster, on Jul. 1, 2005, 3 pages.
Office Action Non-Final for U.S. Appl. No. 11/112,133 dated Aug. 2, 2010.
Notice of Allowance for U.S. Appl. No. 12/483,507 dated Jun. 23, 2010.
"The Cable Guy—Nov. 2003: Windows Peer-to-Peer Networking," Microsoft Technet, http://www.microsoft.com/technet/community/columns/cableguy/cg1103.mspx, Aug. 2004.
"Peer-to-Peer Infrastructure: Identity Manager Functions," Microsoft, http://msdn.microsoft.com/library/en-us/p2psdk/p2p/identity_manager_functions.asp?frame, Dec. 2004.
"Peer-to-Peer Infrastructure: PeerGroupEnumMembers," Microsoft, http://msdn.microsoft.com/library/en-us/p2psdk/p2p/peergroupenummembers.asp?frame=true, Dec. 2004.
"Peer-to-Peer Infrastructure: Creating a Group Chat Application," Microsoft, http://msdn.microsoft.com/library/en-us/p2psdk/p2p/creating_a_group_chat_application.asp..., Dec. 2004.
"Peer-to-Peer Infrastructure: Grouping API Functions," Microsoft, http://msdn.microsoft.com/library/en-us/p2psdk/p2p/grouping_api_functions.asp?frame=true, Jun. 2005.
Advisory Action Before the Filing of an Appeal Brief mailed May 17, 2010, in U.S. Appl. No. 11/112, 134, 3 pp.
Amendment After Final and Response to Final Office Action mailed Mar. 17, 2010, in U.S. Appl. No. 11/112,134, filed May 25, 2010. [Jun. 1, 2010 Enter ANEI w/RCE], 16 pp.
Amendment and Response to Final Office Action mailed Dec. 23, 2010, in U.S. Appl. No. 11/112,134 filed Mar. 21, 2011, 13 pp.
Amendment and Response to Final Office Action Mailed Dec. 30, 2010, filed Mar. 21, 2011 in U.S. Appl. No. 11/112,133, 6 pp.
Amendment and Response to Final Office Action mailed Mar. 17, 2010, in U.S. Appl. No. 11/112,134, filed May 6, 2010, 15 pp.
Amendment and Response to Non-Final Office Action mailed Jul. 8, 2010, in U.S. Appl. No. 11/112,134, filed Sep. 22, 2010, 16 pp.
Amendment and Response to Non-Final Office Action mailed Jun. 25, 2008, in U.S. Appl. No. 11/112,134, filed Dec. 17, 2008, 16 pp.
Amendment and Response to Non-Final Office Action mailed Mar. 20, 2009, in U.S. Appl. No. 11/112,134, filed Jun. 22, 2009, 16 pp.
Amendment in Response to Non-Final Office Action mailed Aug. 2, 2010, filed Oct. 20, 2010 in U.S. Appl. No. 11/112,133, 8 pp.
Chinese Notice on the First Office Action mailed Jan. 19, 2011 in Chinese Application No. 200680013652.2, 12 pp.
Day et al., "A Model for Presence and Instant Messaging," Feb. 2000, Network Working Group, Request for Comments 2778, 16 pp.
European Communication and Supplementary Search Report dated Nov. 13, 2009 in European Application No. 06750716.0-2211, 8 pp.
European Communication mailed Jan. 8, 2010 in European Application No. 06750716.0-2211, 1 p.
European Search Report for EP 06111103 dated Jul. 3, 2006, 6 pp.
Final Office Action mailed Dec. 23, 2010 in U.S. Appl. No. 11/112,134, 23 pp.
Final Office Action mailed Dec. 30, 2010 in U.S. Appl. No. 11/112,133, 14 pp.
Final Office Action mailed Mar. 17, 2010, in U.S. Appl. No. 11/112,134, 38 pp.
International Search Report for PCT/US06/14742, mailed Apr. 1, 2008, 3 pp.
International Search Report for PCT/US06/14986, mailed Jul. 20, 2007, 2 pp.
International Search Report for PCT/US2007/011053 mailed Oct. 14, 2008, 3 pp.
Non-Final Office Action mailed Jul. 8, 2010, in U.S. Appl. No. 11/112,134, 46 pp.
Notice of Non-Compliant Amendment mailed Oct. 29, 2009, in U.S. Appl. No. 11/112, 134, 3 pp.
Response to Chinese Notice on the First Office Action mailed Jan. 19, 2011 in Chinese Application No. 200680013652.2, filed Jun. 1, 2011, 11 pp.
Response to European Communication mailed Jan. 8, 2010 in European Application No. 06750716.0-2211, filed May 17, 2010, 19 pp.
Response to Notice of Non-Compliant Amendment dated Oct. 29, 2009 referring to the Amendment in Response to Non-Final Action dated Jun. 22, 2009, filed Nov. 9, 2009 in U.S. Appl. No. 11/112,134, 11 pp.
Roy, Peter et al. "Distributed Programming in Mozart—A Tutorial Introduction," XP-002454736, Version 1.2.5, Jan. 25, 2003, 70 pp.
"Software Design," Apache, Linux, 2003, 10 pp.
Written Opinion for PCT/US2007/011053 mailed Oct. 14, 2008, 4 pp.
Office Action mailed Jul. 21, 2011 in U.S. Appl. No. 11/112,134, filed Apr. 22, 2005, 23 pgs.

* cited by examiner

APPLICATION PROGRAMMING INTERFACE FOR INVITING PARTICIPANTS IN A SERVERLESS PEER TO PEER NETWORK

CROSS-REFERENCES TO RELATED APPLICATIONS

The subject matter of the present application is generally related to the following commonly-owned applications filed on the same day as the present application:

U.S. patent application Ser. No. 11/112,134 (U.S. Patent Publication No. 2006/0242235 A1), entitled "PRESENCE MONITORING IN A SERVERLESS PEER-TO-PEER SYSTEM";

U.S. patent application Ser. No. 11/112,135 (U.S. Patent Publication No. 2006/0239279 A1), entitled "CONTACT MANAGEMENT IN A SERVERLESS PEER-TO-PEER SYSTEM"; and U.S. patent application Ser. No. 11/112,133 (U.S. Patent Publication No. 2006/0239234 A1), entitled "AN APPLICATION PROGRAMMING INTERFACE FOR DISCOVERING ENDPOINTS IN A SERVERLESS PEER TO PEER NETWORK".

These applications are hereby incorporated by reference herein in their entireties for all purposes.

BACKGROUND

Server based communication services such as the Messenger service provided by MSN® communication services permit users to sign into a server-based network and then use the services of the network (e.g., e-mail, text messaging, etc.). A server may store a contact list for the user and the user can add and delete persons from the contact list. When the user signs in, a server or servers may notify persons in the user's contact list that the user is "online." Similarly, the server or servers may notify the user of persons in the user's contact list that are "online."

The MICROSOFT® Corporation also provides Peer-to-Peer Networking software for use with its WINDOWS® operating systems. With this system, users can create a network of peer computers and can communicate with one another without having to sign into a central server. For example, users can create a peer-to-peer group and then create a chat room in which all members of the group can post messages and see messages posted by others in the group. The system may also allow peers to invite others to participate in collaborative activities. The chat room is maintained using the peer computers and without the need for a central server.

SUMMARY

Methods and computer readable mediums are described that facilitate inviting user entities on a network. The method may include initiating a first application for sending an invitation by a first user entity on a first endpoint, selecting a second user entity to receive the invitation, and selecting an activity. The method may also include sending from the first endpoint to the second user entity the invitation to participate in the activity if the first endpoint determines the activity is supported by a computing application on the first endpoint.

Additionally, the method may include that the first application for sending the invitation is the computing application, that the first application for sending the invitation is a messenger application, and initiating a name resolution mechanism to locate a second endpoint for the second user entity. The method may further include querying a presence store to locate a second endpoint for the second user entity, sending the invitation synchronously or asynchronously, canceling an asynchronous invitation at the first endpoint, and sending the invitation in a secure or unsecure manner.

Furthermore, methods are described that facilitate receiving invitations on a network. The method may include initiating, at a receiving endpoint, a first application for receiving an invitation from a sending endpoint to participate in an activity, receiving the invitation at the receiving endpoint, and launching a computing application on the receiving endpoint to execute the activity if the receiving endpoint determines the activity is capable of being executed by the computing application at the receiving endpoint.

Additionally, the method may include the first application for receiving the invitation is the computing application, the first application for receiving the invitation is a messenger application, and the receiving endpoint receives the invitation by at least one of a generic invitation listener application, a messenger application, or the computing application at the receiving endpoint. The method may further include registering activity capabilities of the computing application at the receiving endpoint with a presence store, receiving the invitation synchronously or asynchronously, receiving the invitation in a secure or unsecure manner, and retrieving, by the sending endpoint, status information of the invitation sent to the receiving endpoint.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
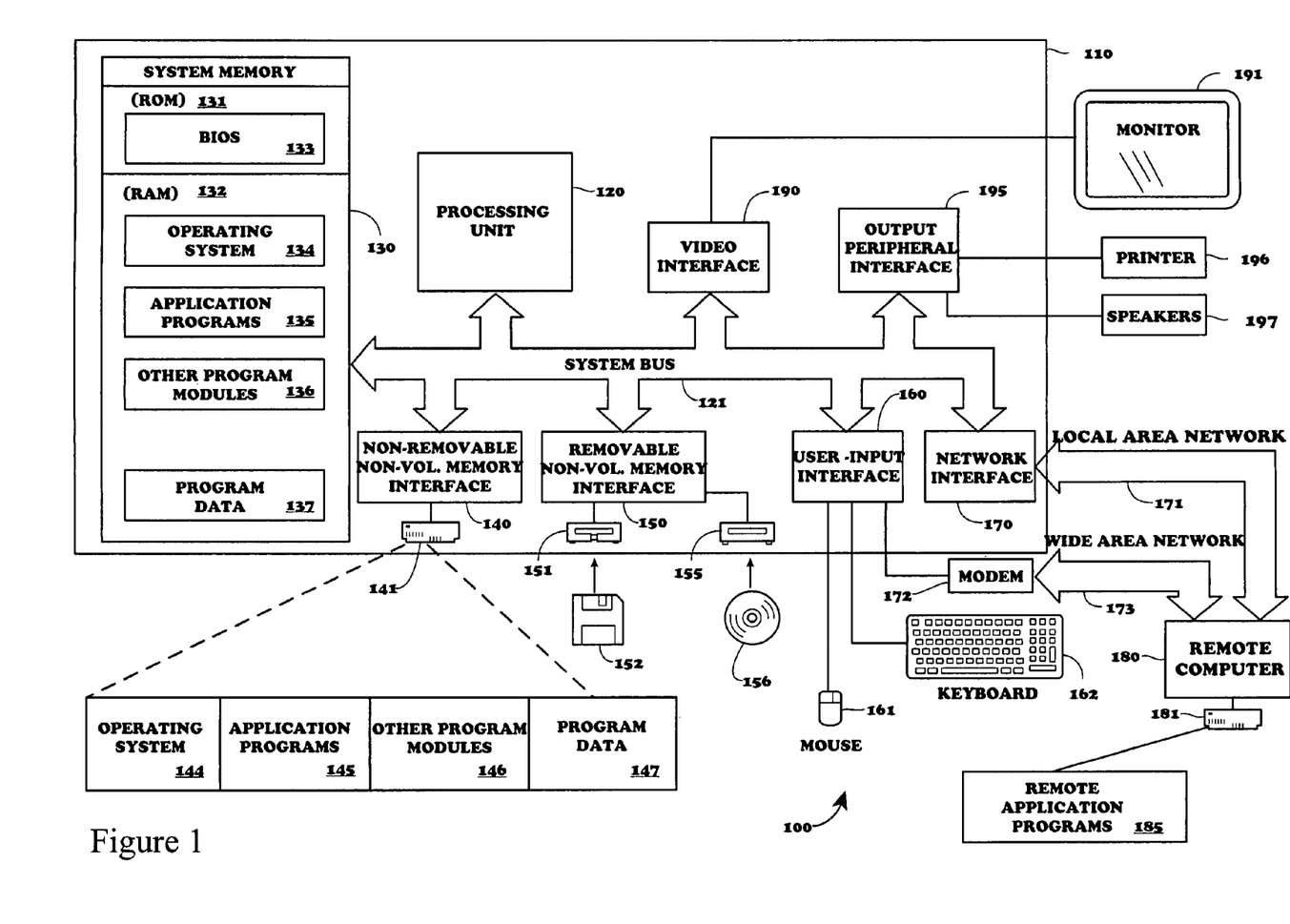
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
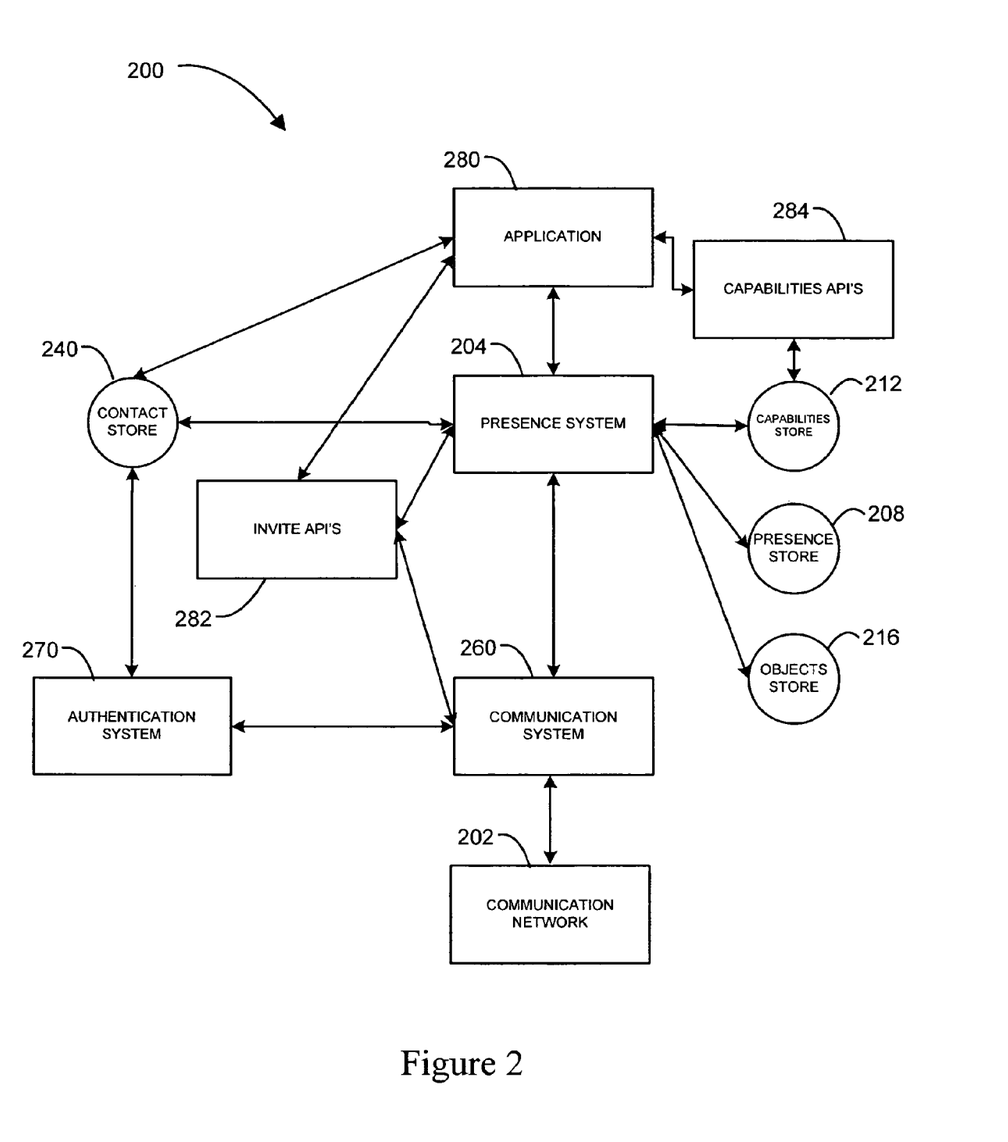
FIG. 2 is a block diagram of an exemplary system that may facilitate peer-to-peer, serverless collaboration and/or communications.

FIG. 2 is a block diagram of an example system 200 that may be used to implement example methods described herein. The system 200 may facilitate peer-to-peer, serverless collaboration and/or communications via a communication network 202, and may be implemented using a computing system such as the computing system 100 of FIG. 1. The communication network may include, but is not limited to, a LAN and/or a WAN, or a communication medium supporting socket communications, or named-pipes, for example.

The system 200 may include a presence system 204 that monitors the presence of other entities on the communication network. An entity may be, for example, a particular person, a device (e.g., a printer, a copier, a computer, a scanner, etc.) a position in an organization (e.g., "manager," "customer service representative," etc.), an organization, etc. Presence on a network may generally refer to a current status of an entity with regard to their willingness or ability to communicate via the network, but may also refer to additional or alternative information regarding the entity such as a current activity of the entity. Presence on a network may be represented by presence information. Examples of presence information may include, but are not limited to, one or more of an indication that an entity is "online," an indication that an entity is "out to lunch," an indication that an entity is "away," an indication that an entity will "be right back," an indication that an entity is "idle," an indication that an entity is "busy," an indication that an entity is "on the phone," an indication that an entity is "watching a movie," an indication that an entity is "playing Halo®," an indication that an entity is "helping another customer," an indication of a device status (e.g., a printer with status "busy," "idle," etc). Presence information may include one or more enumerated strings and/or rich presence (e.g., custom strings generated by a user entity). For example, a user entity could define a custom presence state as, "I am out of the office. Will return tomorrow." Presence information obtained by the presence system 204 may be stored in a presence store 208.

The presence system 204 may facilitate a user entity to monitor (or "subscribe") to presence information of other entities. This may include the presence system 204 polling other computing systems periodically, for example. Additionally or alternatively, other computing systems corresponding to other user entities may transmit event indications to the system 200 that notify the presence system 204 of events such as a change in presence state. For example, an event may occur when a user's presence changes from "offline" to "online," and the presence system 204 may detect this event. The presence system 204 could then notify other applications or software modules (e.g., such as the application 280) that the event occurred.

The presence system 204 may also monitor capabilities of other entities published on the network 202. Capabilities of an entity may include, for example, static capabilities such as whether a computing system of the entity is configured to execute a particular software application, whether a computing system of the entity has a particular hardware device, etc. Capabilities of an entity may also include, for example, dynamic capabilities such as real-time capabilities of an entity with respect to a game software application currently being executed on the entity's computing system, etc. An entity publishing capabilities on the network may refer to permitting other entities to be able to monitor the capabilities via the network 202. Capability information obtained by the presence system 204 may be stored in a capability store 212.

The presence system 204 may also monitor objects of other entities published on the network 202. Objects of an entity may include, for example, data objects such as files, structures, pictures, sounds, a description such as meta-data, a name-value pair, etc. An entity publishing objects on the network may refer to permitting other entities to be able to monitor the objects via the network 202. As just one example, publishing an object may permit an entity to provide other entities with information specific to an application being executed by a computing system of the entity and/or real-time information. With respect to a game application, for instance, a published object could include information regarding a player's current score, a weapon currently in possession of the player, etc. Objects information obtained by the presence system 204 may be stored in an objects store 216.

The presence system 204 may also provide (or "publish") presence information associated with a user entity (i.e., the entity associated with the system 200) to other entities on the network 202. The presence information associated with the user entity may be stored in the presence store 208 or some other storage. Similarly, the presence system 204 may also provide (or "publish") information regarding capabilities of the user entity to other entities on the network 202. The capability information associated with the user entity may be stored in a capability store 208. Further, the presence system 204 may also provide (or "publish") information regarding objects of the user entity to other entities on the network. The object information associated with the user entity may be stored in an object store 216, or some other storage. Similarly, the presence system 204 may facilitate an ability for the user entity to monitor (or "subscribe-to") presence information. As such, when presence information is monitored by the user entity, subsequent changes may elicit events for which the user entity is notified. For example, if the monitored presence information changes from "away" to "playing Halo®," an event may trigger thereby notifying the user entity of a change.

The presence system 204 may interface with a contact store 240 that stores information regarding other entities. The contact store 240 may store information for an entity such as one or more of a secure identifier, a human readable alias, an indicator of whether presence information for this entity is to be monitored, and an indicator of whether to allow this entity to obtain presence information regarding the user entity. An entity as represented in the contact store 240 may be referred to as a contact.

Each user entity may have one or more communication endpoints with which it is associated. Generally, different communication endpoints associated with a user entity may include different communication termination points associated with the entity, such as different computing systems. As an example, endpoints for a particular entity may include a desktop computer at work, a desktop computer at home, a personal digital assistant (PDA), etc. Optionally, different communication endpoints associated with a user entity may also include different software applications being executed by a single computing system. Endpoint information may include a peer name, a machine name, or a device type, to name a few.

The presence system 204 may also interface with a communication system 260, which is coupled to the communication network 202. The communication system 260 may establish connections between the system 200 and other peer computing systems associated with other entities. Establishing a connection may include, for example, one or more of determining an endpoint associated with an entity, resolving an address of the endpoint, authenticating communications, encrypting and decrypting communications, etc. In one implementation, the communication system 260 may include a Peer Name Resolution Protocol (PNRP), or similar. The PNRP may resolve a name (e.g., a peer name) for a contact to derive its IP address without reliance upon a Domain Name System (DNS), commonly used by server computers. In another implementation, the communication system 260 may interface with an authentication system 270 that is itself coupled to the contact store 240. In attempting to establish a connection with another computing system, the communication system 260 may receive from the other computing system an indication of an identifier associated with an entity. The authentication system 270 may then check whether information about the entity with the security identifier presented is stored in the contact store 240. If the identifier is not found in the contact store 240, the connection may be refused.

A connection may be secured. Establishing a connection and communicating over a connection may include, for example, one or more of utilizing a secure channel, utilizing secure socket layer (SSL) techniques, utilizing transport layer security (TLS) techniques, utilizing public/private key pairs, utilizing authentication techniques (e.g., X.509 certificates, encrypted signatures utilizing a pretty good privacy (PGP) program, etc.), utilizing a peer name resolution protocol (PNRP), transmission control protocol (TCP), internet protocol (IP), internet protocol version six (IPv6), etc. Resolving an address of an endpoint may include, for example, resolving a PNRP identifier to an IP address and a port.

A software application 280, or some other software module, may communicate with the presence system 204 to obtain presence information, capabilities information, and/or objects information associated with other user entities on the communication network 202. For example, the presence system 204 may provide a set of application programming interfaces (APIs) that permit software applications to request and receive information regarding presence, capabilities, and/or objects associated with other user entities. The presence system 204 may retrieve the requested information from the presence store 208, capabilities store 212, and/or the objects store 216. Additionally or alternatively, the presence system 204 could obtain requested information from the other user entities via the communication system 260 and the communication network 202. Generally speaking, "availability" may refer to presence information, capabilities and objects. A user entity has the ability to publish all, some, or none of this information.

An Invitation API 282 may permit an application 280 used by a user entity to invite other contacts or user entities of a serverless network to participate in a collaborative activity. The Invitation API 282 may employ the use of the Presence System 204 to determine contacts from the contact store 240. Additionally, the Presence System 204 may retrieve capability information located in the capability store 212. If a particular contact in the contact store 240 has no associated capability information, the Invitation API 282 or, alternatively, the Application 280 may employ a Capabilities API 284 to determine the capabilities of another user entity's endpoint. A capability may be a collaborative activity including any activity which is supported by an application on multiple endpoints. For example, a contact may support the activity of Halo® game play because the contact's endpoint has the Halo® gaming application installed. The Invitation API may allow the contact owner to determine other contacts on a serverless network that may support the activity of Halo® game-play.

When the Invitation API locates a contact that supports the activity, an invitation may be sent by the user entity (invitor) to that contact (invitee), thereby allowing the invitee to respond to the invitation. A response may include standard invitee options of "accept," "reject," or "ignore." Other response options may include standard or custom text such as "busy now, please invite me later," or "please try again after 9 pm." However, if the invitee is not present at the endpoint, or simply chooses not to acknowledge the invitation with "accept," "reject," or "ignore," then the invitation may time-out. Upon expiration of a time-out period, the invitation may disappear from view at the invitee's endpoint, thereby minimizing clutter on the invitee's desktop. Optionally, an invitee may configure alert settings so that, for example, invitation dialog boxes do not interrupt an invitee while giving a presentation. As such, any incoming invitations may automatically receive an indication that the invitee is unavailable. The invitee may further customize such indications, for example, "Presentation ongoing, please try after 4 pm."

Figure 3:
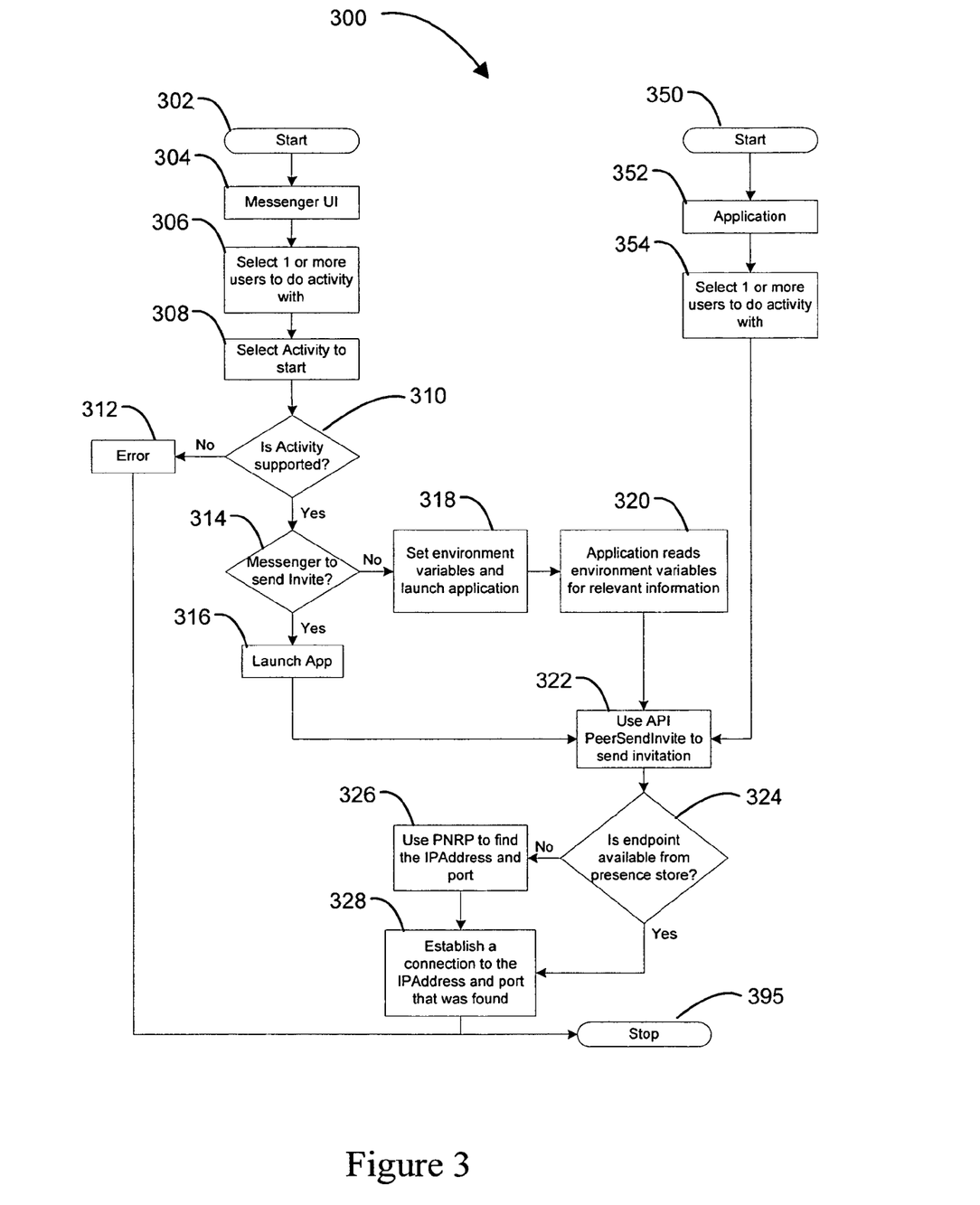
FIG. 3 is a flow diagram of an exemplary method related to sending an invitation to a contact that may facilitate collaborative activities.

FIG. 3 may be an illustration of a method 300 in accordance with the claims. The method may begin at either block 302 or block 350, depending on whether the application 280 used by the user entity is a messenger application (starting at block 302) or a computing application (starting at block 350). Assuming the user entity at an endpoint wishes to send an invitation to a contact for collaborative participation in an activity, but no associated computing application for the activity is currently running, then the user entity may begin the invitation process at block 302. The user entity may access the messenger application 280 at block 304 which may provide the user entity with a list of contacts from the contact store 240. The messenger application 280 may also access the presence system 204 to obtain presence information from the presence store 208 and provide the user entity with presence information for the contacts for which the user has selected. At block 306 the user entity may select a contact and at block 308 the user entity may select a desired activity. The contact selected is not limited to other user entities, but may include one or more of the invitor contact's alternate points of presence. The user may select activities including, but not limited to, playing Halo®, internet telephony, or a collaborative whiteboard. Despite a user entity selecting a particular activity, the Capabilities API 284 may allow the user entity to verify endpoint capabilities at block 310. If the user entity's endpoint is a computer without a telephony application installed, or if the computer has no sound card, the method may proceed to block 312 and terminate 395. Additionally, or alternatively, the method may send a message to the contact selected at block 306 to notify that contact of the failed invitation attempt, and possible reasons for that failure.

Alternatively, if the user entity's endpoint supports the activity, the method may determine if the messenger, or some other application, sends the invitation at block 314. The method may include a default setting in which the messenger always performs the invitation, or the particular application supporting the activity performs the invitation. The method may also prompt the user entity to choose one of the aforementioned options. If the messenger performs the invitation, then, via the Invite API's, the method may launch the corresponding application which supports the activity at block 316. On the other hand, the application supporting the activity may perform the invitation by calling the Invite API 282 which may also set environment variables to the application and launch such application at block 318. The Invite API 282 may also permit the invitation to hold application specific data and/or pass parameters to the application. Such data and parameters may be useful for handshaking of remote applications. Environment variables may include a list of invitees, or other information pertaining to the activity, the application supporting the activity, and the contacts invited to participate in the activity. Once those variables are set at block 318 they may be read by the application 280 at block 320. The application may then use a function call from the Invitation API 282 at block 322 to send the invitation. If, however, a contact has multiple points of presence, the Invitation API 282 may send the invitation to all endpoints for which the invitee is associated.

Notice that, in the alternative, if the computing application 352 is to perform the invitation in lieu of the messenger, control passes from the computing application 352 to block 354 where the user entity may select a contact with which to perform a collaborative activity.

An invitation function call from the Invitation API 282 may require sending parameters derived from the calling application, whether the calling application is the messenger or the application supporting the activity. For example, the sending parameters may include the receiving name or names, the receiving contact endpoint (e.g., an IP address and port), activity information, and a function call handle, to name a few. The Communication System 260 may determine whether a particular endpoint for a contact name is known at block 324. If unknown, block 326 may use the Communication System 260 to determine a corresponding IP address and port for the contact, and then establish a connection with that endpoint at block 328. The Communication System 260 may employ PNRP, or similar, to resolve such endpoint credentials without a server. The activity information may also include a globally unique identifier (GUID) to identify an appropriate application to the invitee (recipient) that may support the desired activity. The activity information may also include an invitation message (e.g., "Let's talk about the TPS report now.") and other information to support various requirements of any particular activity. The handle may allow the function call to receive event information after the invitation is sent to an invitee. Such a handle is particularly useful for asynchronous function calls, however the function calls employed by the Invitation API 282 may also be synchronous, in which case a response is promptly received, or the function call times out. Additionally, another handle may identify the invitation instance so that a cancellation function call may correctly identify a specific invitation to cancel. Generally speaking, upon the user making the function call to send an invitation, an invitation session is created having a corresponding GUID. This GUID may be used to identify responses received as a result of this particular invitation. The Invitation API may serialize the invitation in XML (or other) format before sending to the invitee via the Communication System 260.

Figure 4:
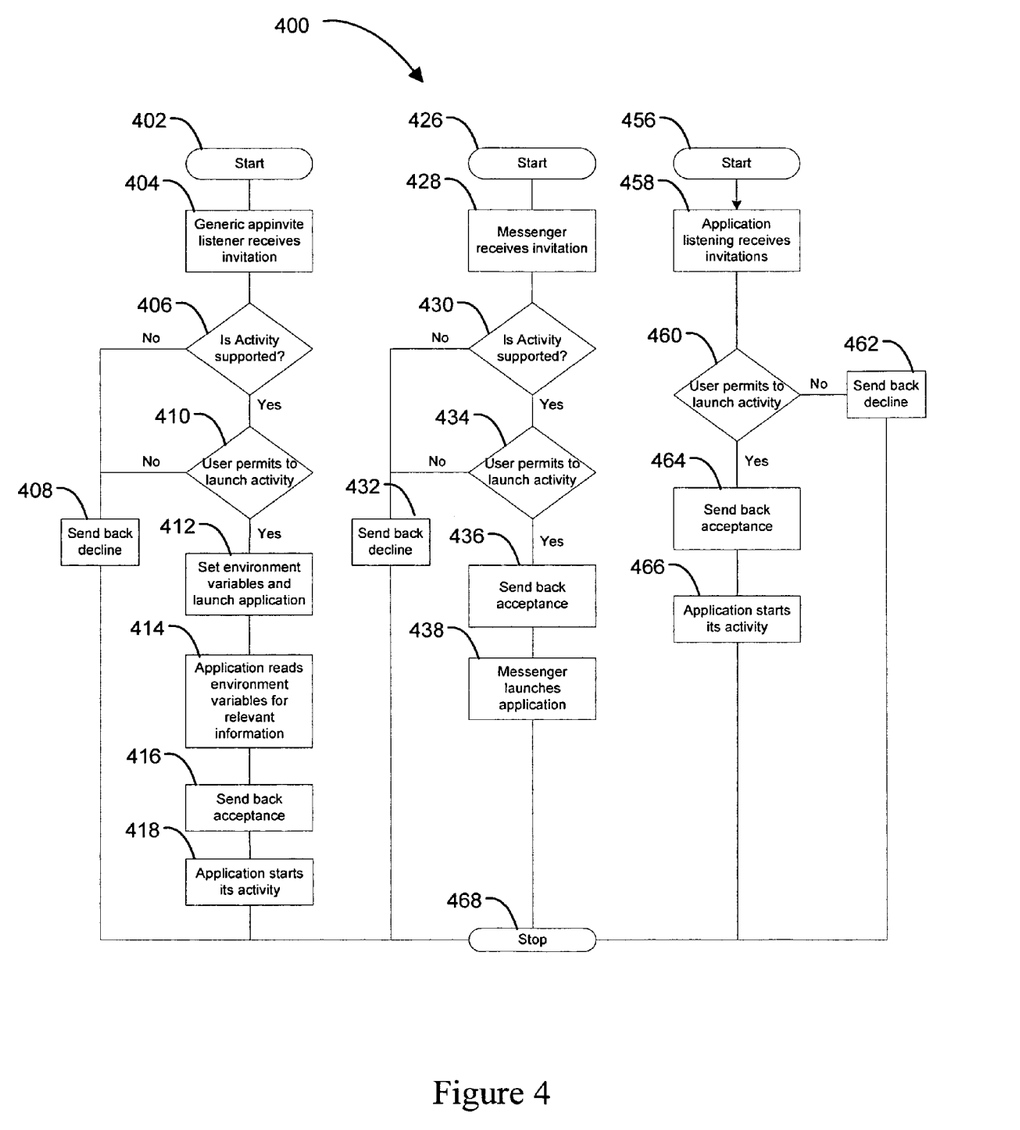
FIG. 4 is a flow diagram of an exemplary method related to receiving an invitation that may facilitate collaborative activities.

FIG. 4 may be an illustration of a method 400 in accordance with the claims. The exemplary method for receiving an invitation may include one of three starting blocks 402, 426, or 456. A starting block is determined by virtue of an invitee's endpoint status as either running an application 280 of type messenger (block 402), running an application 280 supporting the invitation activity (block 426), or not running either of these (block 456). In any of these three cases, the method in FIG. 4 uses function calls from the Invitation API 282 to receive the invitation. Optionally, an invitee may choose to receive invitations from a specific subset of contacts, all contacts, or no contacts at all. In the case of an invitee running a generic user interface or application invitation listener, upon receipt of an invitation at block 404, the Invitation API 282 determines if the endpoint supports the requested activity 406 through a query to the capability store 212. The Capabilities API 284 may make such a determination by checking for a matching GUID in the capabilities store 212 shown in FIG. 2. If not supported (e.g., no appropriate matching GUID found), the Invitation API 282 of the listener sends the calling function (invitor) a decline message at block 408. Alternatively, the Invitation API 282 may permit the invitor, upon determining that the requested activity is not supported by the invitee endpoint, to provide information regarding where the invitee may obtain an application which may support that activity. For example, if the invitor learns that the invitee does not support playing a game of chess, the invitation may include a URL, or other useful information, to allow the invitee to acquire or install an appropriate application supporting the activity. The invitee may choose to install the appropriate application, which may further have a GUID. Protective measures may further guard against newer applications overwriting GUID's of existing applications.

However, if the activity is supported by the listener endpoint, then the invitee may acknowledge the invitation, perhaps via a dialog box, by accepting, rejecting, or ignoring 410. Again, a decline message may be sent at block 408 in which the message may further describe potential reasons for the decline (e.g., activity is not supported at this endpoint, user did not allow the activity, etc.). The response may also be sent automatically by the invitee through a default setting (e.g., always reject invitations from Bob to play Halo®). For example, the invitee may accept all invitations by default, reject all invitations by default, or ignore all invitations by default. Additionally, the invitee may have a default setting of accept, reject or ignore based on the specific identity of the inviter. For example, the invitee may choose to accept all invitations by default if the inviter is a buddy, reject all invitations by default if the inviter is unknown (not in the invitee's contact store), or ignore an invitation by default if the inviter is an in-law. Similar to block 318 in FIG. 3, environment variables are set and the application supporting the activity is launched at block 412. The application reads the environment variables at block 414, sends back acceptance notification 416 and starts its collaborative activity at block 418. Additionally, or alternatively, the Capabilities API 284 may be called at block 414 to obtain relevant information, discussed in further detail below.

If the invitee's endpoint is running the messenger application, then the messenger application may already have appropriate environment variables. As such, blocks 426 through 428 accomplish receipt of the invitation and initiation of the collaborative activity. Similarly, blocks 456 through 466 may execute if the invitee already happens to have the application running that supports the collaborative activity. In such a case, the method does not need to query the invitee's endpoint for the application supporting the collaborative activity because it is already running, but the invitee may still choose to accept, reject, or ignore at block 460.

Returning briefly to block 310 of FIG. 3 and blocks 406 and 430 of FIG. 4, the Capabilities API 284 determines whether the endpoint supports a requested activity. Before the Invitation API 282 may launch an activity, or a specific application that supports the activity, the capabilities supported at that endpoint must be known. As such, the Capabilities API 284 may include functions for registration, unregistration, enumeration of capabilities, and retrieval of information regarding the capabilities. A peer registration function may allow a user entity to add an entry to an operating system registry containing information relating to the capabilities supported by a particular application. Additionally, this information may include a GUID to identify the application, application configuration, and a description of the capability. The peer registration function may further allow the user entity to specify which other user entities or contacts may access the registered application. Alternatively, the user entity may unregister capabilities with an unregister function which removes the capability information from the registry.

A user entity may call, via the application 280, a capability query function to learn about application capabilities when the GUID is known. However, the user entity may first call a capability enumeration function to obtain a list of all capabilities currently registered at an endpoint, including the endpoint of the user entity. The user entity may then select one capability from the enumerated list and call the capability query function for more specific capability information supported by that particular application.

The following exemplary scenario illustrates Invitation API functionality. A user entity named Toby has friends named Bob and Alice in his contacts list. Bob and Alice have each allowed publication of their presence information, and Toby notices that Bob is online and has the game Halo® installed. Toby selects Bob from his contact list and sends an invitation to Bob containing a request to play Halo®. The Invitation API 282 determines that no endpoint connection is currently available and, consequently, employs the Communication Module 260 which may use PNRP to resolve an endpoint from Bob's contact information in Toby's contact store. When such endpoint is determined, the Communication Module 260 may optionally authenticate a connection via the Authentication System 270 between Bob and Toby and then send the invitation. Assuming Bob has his Messenger application running, it receives the invitation and the Capabilities API 284 is called to verify that Halo® is supported on Bob's computer. If it is supported, the Invitation API 282 presents Toby with an option (via a pop-up user interface) to "accept," "reject," or "ignore" the invitation. Bob accepts, the Halo® application is launched, and an "accept" message is returned to the invitor (Toby).

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer-implemented method of inviting a user entity to participate in a selected activity on a peer network, the computer-implemented method comprising:
   receiving an input initiating a first computing application for sending an invitation by a first user entity on a first endpoint on the peer network;
   receiving a selection of a second user entity to receive the invitation;
   resolving an address for a second endpoint on the peer network associated with the second user entity using a peer-to-peer serverless protocol;
   receiving, at the first endpoint through the peer network, capability information, wherein the capability information is different from the address of the second endpoint, the capability information describing capabilities of the second endpoint to perform a collaborative user activity by executing a software application installed at the second endpoint, the capability information including at least dynamic real-time capabilities of the second user entity and identifying the software application at the second endpoint regardless of whether the software application at the second endpoint is being executed when the capability information is received at the first endpoint;
   receiving a selection at the first endpoint of an activity from a plurality of activities, wherein the selected activity is supported by an application at the first endpoint;
   before sending the invitation, determining at the first endpoint, based on the received capability information, whether the second user entity endpoint supports the selected activity; and
   in response to determining at the first endpoint that the second user entity endpoint supports the selected activity, sending from the first endpoint to the resolved address of the second user entity endpoint the invitation from the first user entity to the second user entity to participate in the selected activity by executing the software application at the second endpoint.

2. The computer-implemented method of claim 1 wherein an application for sending the invitation from the first endpoint is a messenger application.

3. The computer-implemented method of claim 1, further comprising sending the invitation by one of: synchronously and asynchronously.

4. The computer-implemented method of claim 3, further comprising canceling an asynchronous invitation at the first endpoint.

5. The computer-implemented method of claim 1, further comprising sending the invitation in one of: a secure and unsecure manner.

6. A computer storage medium not consisting of a propagated data signal and having computer executable instructions for performing a method of inviting a user entity to participate in a selected activity on a peer network, the method comprising:
- receiving an input initiating a first computing application for sending an invitation by a first user entity on a first endpoint on the peer network;
- receiving a selection of a second user entity to receive the invitation;
- resolving an address for a second endpoint on the peer network associated with the second user entity using a peer-to-peer serverless protocol;
- receiving, at the first endpoint through the peer network, capability information, wherein the capability information is different from the address of the second endpoint, the capability information describing capabilities of the second endpoint to perform a collaborative user activity by executing a software application installed at the second endpoint, the capability information including at least dynamic real-time capabilities of the second user entity and identifying the software application at the second endpoint regardless of whether the software application at the second endpoint is being executed when the capability information is received at the first endpoint;
- receiving a selection at the first endpoint of an activity from a plurality of activities, wherein the selected activity is supported by an application at the first endpoint;
- before sending the invitation, determining at the first endpoint, based on the received capability information, whether the second user entity endpoint supports the selected activity; and
- in response to determining at the first endpoint that the second user entity endpoint supports the selected activity, sending from the first endpoint to the resolved address of the second user entity endpoint the invitation from the first user entity to the second user entity to participate in the selected activity by executing the software application at the second endpoint.

7. The computer storage medium of claim 6, wherein an application for sending the invitation from the first endpoint is the first computing application.

8. The computer storage medium of claim 6, wherein an application for sending the invitation from the first endpoint is a messenger application.

9. A system for inviting a user entity to participate in a selected activity on a peer network, comprising:
- a processing unit;
- a memory, communicatively coupled to the processing unit, storing instructions that, when executed by the processing unit, perform the following method:
  - receiving an input initiating a first computing application for sending an invitation by a first user entity on a first endpoint on the peer network;
  - receiving a selection of a second user entity to receive the invitation;
  - resolving an address for a second endpoint on the peer network associated with the second user entity using a peer-to-peer serverless protocol;
  - receiving, at the first endpoint through the peer network, capability information, wherein the capability information is different from the address of the second endpoint, the capability information describing capabilities of the second endpoint to perform a collaborative user activity by executing a software application installed at the second endpoint, the capability information including at least dynamic real-time capabilities of the second user entity and identifying the software application at the second endpoint regardless of whether the software application at the second endpoint is being executed when the capability information is received at the first endpoint;
  - receiving a selection at the first endpoint of an activity from a plurality of activities, wherein the selected activity is supported by an application at the first endpoint;
  - before sending the invitation, determining at the first endpoint, based on the received capability information, whether the second user entity endpoint supports the selected activity; and
  - in response to determining at the first endpoint that the second user entity supports the selected activity, sending from the first endpoint to the resolved address of the second user entity endpoint the invitation from the first user entity to the second user entity to participate in the selected activity by executing the software application at the second endpoint.

10. The system of claim 9 wherein an application for sending the invitation from the first endpoint is a messenger application.

\* \* \* \* \*